United States Patent
Liu

(10) Patent No.: US 7,742,400 B2
(45) Date of Patent: Jun. 22, 2010

(54) METHOD AND SYSTEM FOR DETECTING LINK FAILURE BETWEEN NODES IN A HYBRID NETWORK

(75) Inventor: Shaowei Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 11/860,239

(22) Filed: Sep. 24, 2007

(65) Prior Publication Data

US 2008/0037436 A1    Feb. 14, 2008

Related U.S. Application Data

(63) Continuation of application No. PCT/CN2005/001953, filed on Nov. 18, 2005.

(30) Foreign Application Priority Data

Mar. 25, 2005    (CN)    ................ 2005 1 0058937

(51) Int. Cl.
*G01R 31/08* (2006.01)
(52) U.S. Cl. .............. 370/218; 370/236.2; 370/241.1
(58) Field of Classification Search ............. 370/241.1
See application file for complete search history.

(56) References Cited

U.S. PATENT DOCUMENTS

| 7,164,652 B2 | 1/2007 | Puppa et al. |
| 7,561,527 B1 * | 7/2009 | Katz et al. ................ 370/241 |
| 2003/0112748 A1 | 6/2003 | Puppa et al. |
| 2004/0133368 A1 | 7/2004 | Johansson et al. |
| 2005/0226236 A1 | 10/2005 | Klink |
| 2006/0153067 A1 * | 7/2006 | Vasseur et al. ............. 370/217 |
| 2007/0081465 A1 | 4/2007 | Puppa et al. |

FOREIGN PATENT DOCUMENTS

| CN | 1514585 A | 7/2004 |
| WO | WO 03/094443 A1 | 11/2003 |

OTHER PUBLICATIONS

R. Aggarwal, OAM mechanisms in MPLS layer 2 transport networks, Oct. 10, 2004, Communication Magazine, IEEE, vol. 42, Issue 10, pp. 124-130.*

* cited by examiner

*Primary Examiner*—Ian N Moore
*Assistant Examiner*—Matthew Hopkins
(74) *Attorney, Agent, or Firm*—Leydig, Voit & Mayer, Ltd.

(57) ABSTRACT

A method for detecting link failures between nodes in hybrid networks includes: establishing sub-BFD connections between nodes and edge nodes and establishing an end-to-end BFD connection. When a failure occurs in the sub-BFD connection of IP network segment, notify a peer node of the failure via the end-to-end BFD connection. When a failure occurs in the MPLS OAM mechanism of MPLS network segment, the edge node notifies the node of the failure via the sub-BFD connection. Another method includes: establishing sub-BFD connections between nodes and edge nodes. When one end of the sub-BFD connection failures, notify the IP network segment at the peer end of the failure via an extended MPLS OAM mechanism and notify the node of the failure via the sub-BFD connection of the IP network segment. An interworking between the BFD detecting mechanism and the MPLS OAM detecting mechanism in a hybrid network can be implemented.

15 Claims, 3 Drawing Sheets

METHOD AND SYSTEM FOR DETECTING LINK FAILURE BETWEEN NODES IN A HYBRID NETWORK

This application is a continuation of International Patent Application No. PCT/CN2005/001953, filed Nov. 18, 2005, which claims priority to Chinese Patent Application No. 200510058937.5, filed Mar. 25, 2005, both of which are hereby incorporated by reference.

FIELD OF THE INVENTION

The present invention relates to the network failure detection technology, and more particular, to methods and systems for detecting a link failure between nodes in a hybrid network.

BACKGROUND OF THE INVENTION

Along with the development of communication technology, Next Generation Network (NGN) technology is developing vigorously. In the current NGN, however, it has become a pressing important issue that how to guarantee the quality of data transmission and to quickly detect a link failure, for example, when unclear voice occurs during the data transmission.

To address the above issue, an Operation and Maintenance (OAM) technique has been provided. The technique can automatically detect various failures of network and adopt the corresponding remedial measures to avoid extension of the failures or try the best to eliminate the failures, and diminish or eliminate negative effects brought by the failures. The existing OAM technique primarily includes the Bidirectional Forwarding Detection (BFD) technique and the Multi-Protocol Label Switching (MPLS) OAM technique provided by the Intentional Telecommunications Union (ITU).

modes which may be selected, as well as an additional function that can be used in combination with the two modes.

The primary mode is known as asynchronous mode. In this mode, a BFD session is established between Node A and Node E. Node A and Node E periodically send hello packets, i.e. BFD packets, to one another, and if a number of those packets are not received by the other node, the session is declared to be down.

The second mode is known as Demand mode. In this mode, it is assumed that each node has an independent way of verifying that it has connectivity to the other node. Once a BFD session for detecting a failure is established, Node A or Node E stops sending BFD control packets to the other, except when either node feels the need to verify connectivity explicitly, in which case a short sequence of BFD control packets is sent, and then the protocol quiesces.

An adjunct to both modes is an Echo function. That is, when the Echo function is active, a hello packet transmitted by Node A in such a way as to have the Node E loop the hello packet back. Node A detects whether the hello packet is lost and determines whether a failure occurs in the link between Node A and Node E based on the detection. The echo function may be used with either asynchronous or Demand mode. Since the Echo function is handling the task of detection, the periodical packets may be reduced in the case of asynchronous mode and the hello packet may be eliminated completely in the case of Demand mode.

In addition, the rate of transmission of hello packets may be negotiated between Node A and Node E so as to notify the one another of the rate at which they can receive and send the packets, and eventually determine the rate of transmission of the hello packets.

A BFD control packet is transmitted in a User Datagram Protocol (UDP) packet with the destination port of 3784 and the source port in a range of 49252-65535, while the destination port of a response packet is 3785. The BFD control packet format is as shown in Table 1.

TABLE 1

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 ... |
|---|---|---|---|---|---|---|---|---|---|---|---|---|---|---|---|---|---|---|---|---|---|---|---|---|---|
| Vers | | | | Diag | | | | H | D | P | F | C | A | Rsv | | | | Detect Mult | | | | | | Length | |
| My Discriminator | | | | | | | | | | | | | | | | | | | | | | | | | |
| Your Discriminator | | | | | | | | | | | | | | | | | | | | | | | | | |
| Desired Min TX Interval | | | | | | | | | | | | | | | | | | | | | | | | | |
| Required Min RX Interval | | | | | | | | | | | | | | | | | | | | | | | | | |
| Required Min Echo RX Interval | | | | | | | | | | | | | | | | | | | | | | | | | |

The BFD is a Hello mechanism. Refer to "IETF: draft-ietf-bfd-base-00", "IETF: draft-ietf-bfd-mpls-00" and "IETF:

The BFD control packet also includes an optional section, and the format of which is as shown in Table 2.

TABLE 2

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 ... |
|---|---|---|---|---|---|---|---|---|---|---|---|---|---|---|---|---|---|---|---|---|---|---|---|---|---|
| Auth Type | | | | | | | | | Auth Len | | | | | | | | | Authentication Data | | | | | | | | draft-ietf-mpls-lsp-ping-05" disclosed by the Internet Engineering Task Force (IETF) for detail.

FIG. 1 is a schematic link in an NGN network. The BFD technique is herein described with the link between Node A and Node E as shown in FIG. 1. The BFD has two operating The first lines in above Tables 1 and 2 include the data bits of the packet, and the other lines thereof indicate the name of each field included in the BFD control packet. The description of each field is as shown in Table 3.

TABLE 3

| Field name | Indication |
| --- | --- |
| Version (Vers) | The latest version number of the protocol, and this document defines protocol version 0. |
| Diagnostic(Diag) | A diagnostic code specifying the local system's reason for the last transition of the session from Up to some other state. Values are:<br>0—No Diagnostic<br>1—Control Detection Time Expired<br>2—Echo Function Failed<br>3—Neighbor Signaled Session Down<br>4—Forwarding Plane Reset<br>5—Path Down<br>6—Concatenated Path Down<br>7—Administratively Down<br>8-31—Reserved for future use |
| I Hear You (H) | This bit is set to 0 if the transmitting system either is not receiving BFD packets from the remote system, or is in the process of tearing down the BFD session for some reason. This bit is set to 1 if the transmitting system believes it is communicating with the remote system. |
| Demand (D) | If set, the transmitting system wishes to operate in Demand Mode. If clear, the transmitting system does not wish to or is not capable of operating in Demand Mode. |
| Poll (P) | If set, the transmitting system is requesting verification of connectivity, or of a parameter change. If clear, thetransmitting system is not requesting verification. |
| Final (F) | If set, the transmitting system is responding to a received BFD control packet that had the Poll (P) bit set. If clear, the transmitting system is not responding to a Poll. |
| Control Plane Independent (C) | If set, the transmitting system's BFD implementation does not share fate with its control plane (in other words, BFD is implemented in the forwarding plane and can continue to function through disruptions in the control plane.) If clear, the transmitting system's BFD implementation shares fate with its control plane. |
| Authentication Present (A) | If set, the Authentication Section is present and the session is to be authenticated. |
| Reserved (Rsv) | These bits must be zero on transmit, and ignored on receipt. |
| Detect Mult | Detect time multiplier. The negotiated transmit interval, multiplied by this value, provides the detection time for the transmitting system in Asynchronous mode. |
| Length | Length of the BFD Control packet, in bytes. |
| My Discriminator | A unique, nonzero discriminator value generated by the transmitting system, used to demultiplex multiple BFD sessions between the same pair of systems. |
| Your Discriminator | he discriminator received from the corresponding remote system. This field reflects back the received value of My Discriminator, or is zero if that value is unknown. |
| Desired Min TX Interval | This is the minimum interval, in microseconds, that the local system would like to use when transmitting BFD Control packets. |
| Required Min RX Interval | This is the minimum interval, in microseconds, between received BFD Control packets that this system is capable of supporting. |
| Required Min Echo RX Interval | This is the minimum interval, in microseconds, between received BFD Echo packets that this system is capable of supporting. If this value is zero, the transmitting system does not support the receipt of BFD Echo packets. |
| Auth Type | The authentication type in use, if the Authentication Present (A) bit is set.<br>0—Reserved<br>1—Simple Password<br>2—Keyed MD5<br>3—Meticulous Keyed MD5<br>4-255—Reserved for future use |
| Auth Len | The length, in bytes, of the authentication section, including the Auth Type and Auth Len fields. |

The BFD also provides a function to detect MPLS Label switched path (LSP). However, the BFD needs to be combined with the LSP ping, and on the initial stage, a connection should be established via the LSP Ping.

The current BFD technique receives more and more support from data communication products, such as a router. The route protocols of mainstream manufacturers have supported or are supporting the fast convergence via BFD fast detection, and all the routers of mainstream manufacturers have supported or are supporting BFD based link detection function.

As the emergence of BFD technique is late, however, the solutions to actual problems in some network applications have not been disclosed. For example, in MPLS LSP detection, there has been no complete solution or no solution at all on how to suppress alarm storms and how to interwork with OAM on other layers, e.g. how to interwork with the link layer Ascluronous Transfer Mode (ATM) OAM mechanism to provide a detailed protection switching mechanism.

As above disadvantages of BFD, the ITU MPLS OAM mechanism is generally adopted in the MPLS network for failure detection. The ITU MPLS OAM mechanism is only applicable to the MPLS network. As the LSP of MPLS is established in segments and can be nested, suppose that outer layer tunnels LSPab, LSPbc, LSPcd and LSPde as well as an inner layer tunnel LSPae is established between AB, BC, CD, DE and AE, respectively, wherein the tunnel label of LSPae is nested in the label of the outer tunnel labels, that is, in a packet sent from Node A to Node E, the inner label is the label of LSPae and the outer label is the label of each segment of the outer tunnel. An old outer label will be changed to a new label when arriving at a new segment.

Refer to the Y.1710, Y.1711, Y.1712, Y.1713 and Y.1720 of ITUT for the detailed solutions of the ITU MPLS OAM mechanism.

Similar to the BFD, the ITU MPLS OAM mechanism detects a link failure by sending a Hello packet between two nodes. Furthermore, with the label nesting mechanism, some useful mechanisms are added to the MPLS OAM mechanism, which is described below with additional reference to FIG. 1.

1. Forward Defect Indicator (FDI) mechanism. Detect and determine a defect location via the FDI mechanism. As shown in FIG. 1, an OAM packet of MPLS OAM mechanism needs running over the link LSP of AB, BC, CD, DE and AE. The OAM packet is also a Hello packet which is called a Connectivity Verification (CV) packet or a Fast Failure Detection (FFD) packet in the ITUT. When an outer layer tunnel link continuously loses some number of packets in a period of time, the outer layer tunnel link may be invalid. Suppose that the OAM mechanism of LSPbc detects that the link between Node B and Node C is invalid, Node B reports a defect report to a network management device and automatically sends to Node E a FDI packet for reporting that the link LSPbc is invalid, and Node E determines that all inner LSP tunnel links nested in the Link LSPbc are invalid. The network management device determines that the failure point is located between Node B and Node C according to the failure report from Node B. In addition, the FDI mechanism may be used for suppressing alarm storms.

2. Backward Defect Indication (BDI) mechanism. In the FDI, if a return link exists, after receiving the FDI packet, Node E will return a BDI packet to Node A. The BDI packet is used for notifying Node A that the link between Node A and Node E is invalid and the link between Node A and Node E should be switched.

3. The MPLS OAM mechanism may run FDI packets with high detection rate in outer layer tunnels, such as LSPab, LSPbc, LSPcd and LSPde. These outer layer tunnels are relatively important because they carry a number of inner tunnels. The MPLS OAM mechanism runs FDI packets with low detection rate in inner tunnels, such as LSPae. When a failure is detected in an outer tunnel, the outer tunnel will introduce the alarm into the inner tunnels nested in the outer tunnel automatically to reduce resource consumption.

4. The MPLS OAM mechanism may also establish two tunnels, and one of them is used as a backup tunnel. Upon detecting a failure in a link, the link may quickly switch to the backup tunnel to implement the backup function.

At present, data communication devices generally support the BFD because route protocols used by the data communication devices require the BFD, for example, most of the devices in an IP network support the BFD. In terms of transmission devices, such as the devices in an MPLS network, tend to adopt the ITUT MPLS OAM mechanism since these transmission devices are primarily implemented with hardware.

However, no interworking method between the MPLS OAM mechanism of ITUT and the BFD has been provided. Thus, in a hybrid network including the BFD mechanism and the MPLS OAM mechanism, the interworking of two mechanisms has no solution so far, thus a failure of inter-network link may not be detected. Hereinafter the inter-network link refers to a link crossing multiple networks with different detection mechanisms.

For example, the interworking of detecting mechanisms between the IP network and the MPLS network has no solution in the prior art. FIG. 2 shows a schematic illustrating the networking of a hybrid network consisting of an IP network and an MPLS network. As shown in FIG. 2, suppose that the network between N2 and N6 is an MPLS network, and the networks between N0 and N2 as well as between N6 and N8 are IP networks, wherein the BFD mechanism is adopted by the IP network and the MPLS OAM mechanism is adopted by the MPLS network. When a failure is detected, N0 and N8 should be notified. However, since no solution exists for implementing the interworking between the BFD and the MPLS OAM mechanism, N0 may be notified a failure detected between N0 and N2 but N8 is unable to be notified; N8 may be notified a failure detected between N6 and N8 but N0 is unable to be notified; and N2 and N6 may be notified a failure detected between N2 and N6 but N0 and N8 are unable to be notified.

SUMMARY OF THE INVENTION

Embodiments of the invention provide two methods and two systems for detecting a link failure between nodes in a hybrid network, to implement the interworking between the BFD mechanism and the MPLS OAM mechanism.

In accordance with an embodiment of the present invention, a method for detecting a link failure between nodes in a hybrid network which includes an Internet Protocol (IP) network segment using a Bidirectional Forwarding Detection (BFD) mechanism and including a node therein, and a Multi-Protocol Label Switching (MPLS) network segment using an MPLS Operation and Maintenance (OAM) mechanism and including a peer node therein corresponding to the node, includes:

establishing a sub-BFD connection between the node and an edge node which is in both the IP network segment and the MPLS network segment and is adjacent to the node;

establishing an end-to-end BFD connection between the node and the peer node;

establishing on the edge node a first table including an end-to-end address pair of the node and peer node, an LSP number corresponding to the end-to-end address pair and an identifier of the sub-BFD connection corresponding to the end-to-end address pair;

establishing on the node a second table including the end-to-end address pair, the identifier of the sub-BFD connection corresponding to the end-to-end address pair and an identifier of the end-to-end BFD connection corresponding to the end-to-end address pair;

upon detecting a failure on the sub-BFD connection of the IP network segment, the node inquiring the end-to-end address pair corresponding to the identifier of the sub-BFD connection from the second table, inquiring the identifier of the end-to-end BFD connection corresponding to the inquired end-to-end address pair from the second table, and notifying the failure to the peer node via the inquired end-to-end BFD connection; and upon detecting a failure by the MPLS OAM mechanism of the MPLS network segment, the edge node inquiring the end-to-end address pair corresponding to an LSP number of a failed LSP from the first table, inquiring the identifier of the sub-BFD connection corresponding to the inquired end-to-end address pair from the first table, and notifying the node the failure via the inquired sub-BFD connection.

The process of establishing a sub-BFD connection between the node and the edge node may include:

sending a BFD control packet carrying the end-to-end address pair to the edge node by the node; and upon receiving the BFD control packet, the edge node establishing the sub-BFD connection with the node and setting the sub-BFD connection in an asynchronous mode.

The BFD control packet carrying the end-to-end address pair comprises an extended Type Length Vector (TLV) field and the end-to-end address pair is in the TLV field.

The failure detected by the MPLS OAM mechanism of the MPLS network segment is a unidirectional failure and the edge node is an edge node designated by the unidirectional failure, the method further includes:

upon notifying the node of the failure via the inquired sub-BFD connection by the edge node, the node inquiring the end-to-end address pair corresponding to the identifier of the sub-BFD connection from the second table, inquiring the identifier of the end-to-end BFD connection corresponding to the inquired end-to-end address pair from the second table, and notifying the peer node of the failure via the inquired end-to-end BFD connection.

The process of the node notifying the peer node of the failure via the inquired end-to-end BFD connection comprises:

the node inserting into the inquired end-to-end BFD connection a BFD control packet which carries an identifier of an end-to-end failure and sending the BFD control packet to the peer node; and upon receiving the BFD control packet, the peer node determining that a failure occurs in a link between the node and the peer node detected by the end-to-end BFD connection according to the identifier of the end-to-end failure carried in the BFD control packet.

The identifier of the end-to-end failure is denoted by the value of a Diagnostic field of the BFD control packet in a range from 8 to 31.

In accordance another embodiment of the present invention, another method for detecting a link failure between nodes in a hybrid network which includes at least two Internet Protocol (IP) network segments using a Bidirectional Forwarding Detection (BFD) mechanism and including a first IP network segment with a node therein and a second IP network segment with a peer node therein corresponding to the node, and a Multi-Protocol Label Switching (MPLS) network segment using an MPLS Operation and Maintenance (OAM) mechanism, may include:

establishing a first sub-BFD connection between the node in the first IP network segment and an first edge node which is in both the first IP network segment and the MPLS network segment and is adjacent to the node;

establishing on the first edge node a first table including an end-to-end address pair of the node and peer node, an LSP number corresponding to the end-to-end address pair and an identifier of the first sub-BFD connection corresponding to the end-to-end address pair;

establishing on a second edge node a second table including the end-to-end address pair of the node and the peer node, an LSP number corresponding to the end-to-end address pair and identifiers of second sub-BFD connections, wherein the second sub-BFD connections are established between the second edge node and the peer node and are corresponding to the LSP number, and the second edge node is in both a second IP network segment and the MPLS network segment and adjacent to the peer node;

upon detecting a failure on the first sub-BFD connection, the first edge node inquiring the end-to-end address pair corresponding to the identifier of the first sub-BFD connection and inquiring the LSP number corresponding to the inquired end-to-end address pair from the first table, and sending an OAM packet carrying a failure identifier and the inquired end-to-end address pair to the second edge node via an LSP corresponding to the LSP number inquired;

upon receiving the OAM packet, the second edge node inquiring identifiers of all the second sub-BFD connections corresponding to the LSP number from the second table and inquiring an identifier of a second sub-BFD connection corresponding to the end-to-end address pair from the identifiers of all the second sub-BFD connections according to the LSP number of the OAM packet, and notifying the peer node of the failure via the second sub-BFD connection corresponding to the identifier of the second sub-BFD connection inquired; and upon detecting a failure by the MPLS OAM mechanism of MPLS network segment, the first edge node inquiring an end-to-end address pair corresponding to an LSP number of a failed LSP from the first table, inquiring an identifier of a first sub-BFD connection corresponding to the inquired end-to-end address pair from the first table, and notifying the node of the failure via the first sub-BFD connection inquired.

The process of establishing a first sub-BFD connection between the node and the first edge node comprises:

sending by the node a BFD control packet carrying the end-to-end address pair to the first edge node; and upon receiving the BFD control packet, the first edge node establishing the first sub-BFD connection with the node and setting the first sub-BFD connection in an asynchronous mode.

The BFD control packet carrying the end-to-end address pair comprises an extended Type Length Vector (TLV) field and the end-to-end address pair is in the TLV field.

The method further includes:

establishing on the peer node a third table including the identifiers of the second sub-BFD connections and the end-to-end address pair corresponding to the identifiers of the second sub-BFD connections, wherein the second sub-BFD connections are established between the second edge node and the peer node and are corresponding to the LSP number;

wherein the second edge node adjacent to the peer node notifying the peer node of the failure via the inquired sub-BFD connection comprises:

the second edge node inserting into the second sub-BFD connection inquired a BFD control packet carrying the failure identifier and sending the BFD control packet to the peer node; upon receiving the BFD control packet, the peer node acquiring the identifier of the second sub-BFD connection inquired from the BFD control packet and inquiring the end-to-end address pair corresponding to the identifier of the second sub-BFD connection from the third table, and determining that the failure occurs in a link between the node and the peer node indicated by the inquired end-to-end address pair according to the failure identifier carried in the BFD control packet.

The failure identifier is denoted by the value of a Diagnostic field of the BFD control packet in a range from 8 to 31.

In another embodiment of the present invention, a system for detecting a link failure between nodes in a hybrid network, may include:

a node in an Internet Protocol (IP) network using a Bidirectional Forwarding Detection (BFD) mechanism;

a peer node in a Multi-Protocol Label Switching (MPLS) network segment using an MPLS Operation and Maintenance (OAM) mechanism and corresponding to the node;

an edge node configured in both the IP network segment and the MPLS network segment; wherein a sub-BFD connection is established between the node and the edge node; an end-to-end BFD connection is established between the node and the peer node;

the edge node is configured with a first table including an end-to-end address pair of the node and peer node, an LSP number corresponding to the end-to-end address pair and an identifier of the sub-BFD connection corresponding to the end-to-end address pair; and the node is configured with a second table including the end-to-end address pair, the identifier of the sub-BFD connection corresponding to the end-to-end address pair and an identifier of the end-to-end BFD connection corresponding to the end-to-end address pair;

when a failure is detected on the sub-BFD connection of the IP network segment, the node inquires the end-to-end address pair corresponding to the identifier of the sub-BFD connection from the second table, inquires the identifier of the end-to-end BFD connection corresponding to the inquired end-to-end address pair from the second table, and notifies the failure to the peer node via the inquired end-to-end BFD connection; and when a failure is detected by the MPLS OAM mechanism of the MPLS network segment, the edge node inquires the end-to-end address pair corresponding to an LSP number of a failed LSP from the first table, inquires the identifier of the sub-BFD connection corresponding to the inquired end-to-end address pair from the first table, and notifies the failure to the node via the inquired sub-BFD connection.

In another embodiment of the present invention, another system another system for detecting a link failure between nodes in a hybrid network, may include:

a node in a first Internet Protocol (IP) network segment, and a peer node in a second IP network segment corresponding to the node, wherein the first and second IP network segment use a Bidirectional Forwarding Detection (BFD) mechanism;

a first edge node configured in both the first IP network segment and a Multi-Protocol Label Switching (MPLS) network segment and being adjacent to the node, and a second edge node configured in both the second IP network segment and the MPLS network segment and being adjacent to the peer node, wherein the MPLS network segment uses an MPLS Operation and Maintenance (OAM) mechanism;

wherein the node and the first edge node are configured to establish a first sub-BFD connection between the node and the first edge node;

the first edge node is configured with a first table including an end-to-end address pair of the node and peer node, an LSP number corresponding to the end-to-end address pair and an identifier of the first sub-BFD connection corresponding to the end-to-end address pair;

the second edge node is configured with a second table including an end-to-end address pair of the node and the peer node, an LSP number corresponding to the end-to-end address pair and identifiers of second sub-BFD connections, wherein the second sub-BFD connections are established between the second edge node and the peer node and are corresponding to the LSP number;

upon detecting a failure on the first sub-BFD connection of the IP network segment, the first edge node inquires the end-to-end address pair corresponding to the identifier of the first sub-BFD connection and inquires the LSP number corresponding to the inquired end-to-end address pair from the first table, and sends an OAM packet carrying a failure identifier and the inquired end-to-end address pair to the second edge node via an LSP corresponding to the LSP number inquired;

upon receiving the OAM packet, the second edge node inquires identifiers of all the second sub-BFD connections corresponding to the LSP number from the second table and inquires an identifier of a second sub-BFD connection corresponding to the end-to-end address pair from the identifiers of all the second sub-BFD connections according to the LSP number of the OAM packet, and notifying the peer node of the failure via the second sub-BFD connection corresponding to the identifier of the second sub-BFD connection inquired; and upon detecting a failure by the MPLS OAM mechanism of MPLS network segment, the first edge node inquires an end-to-end address pair corresponding to an LSP number of a failed LSP from the first table, inquires an identifier of a first sub-BFD connection corresponding to the inquired end-to-end address pair from the first table, and notifies the node of the failure via the first sub-BFD connection.

Embodiments of this invention propose a solution to detect a failure by establishing an end-to-end BFD connection or extending the MPLS OAM mechanism, the interworking problem of the detecting mechanisms between an MPLS network segment using the MPLS OAM mechanism of ITUT and an IP network segment using the BFD detecting mechanism has been effectively solved.

According to embodiments of this invention, an end-to-end BFD connection is established for IP network segments and extends the data structure of BFD, the IP network segments are capable of transferring a failure report over an MPLS network segment transparently, which enhances the function of BFD detecting mechanism greatly. Therefore, an IP network segment which uses the BFD mechanism and works at the network layer is capable of interworking the detecting mechanism with the MPLS network segment, which enhances the failure detecting function of IP network segment greatly, making it possible to detect the link passed by an IP flow.

An embodiment of this invention establishes a table which indicates a relationship between an LSP number, an end-to-end address pair and a BFD connection identifier on the edge node between the IP network segment and the MPLS network segment, and introduces failure information between different network segments by inquiring the table. In this way, the methods and systems in accordance with the embodiments of the present invention is adapted to the characteristic that the LSP number and the IP address change dynamically in a hybrid network, and make it possible to transfer the failure information exactly.

DETAILED DESCRIPTION OF THE INVENTION

The implementation of this invention is hereinafter described with reference to the accompanying drawings and specific embodiments.

Figure 1:
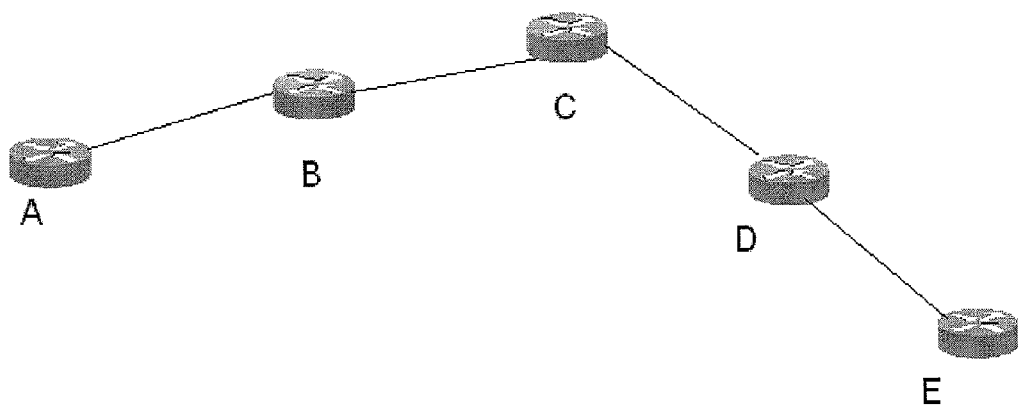
FIG. 1 is a schematic diagram of a network link in a NGN.
Figure 2:
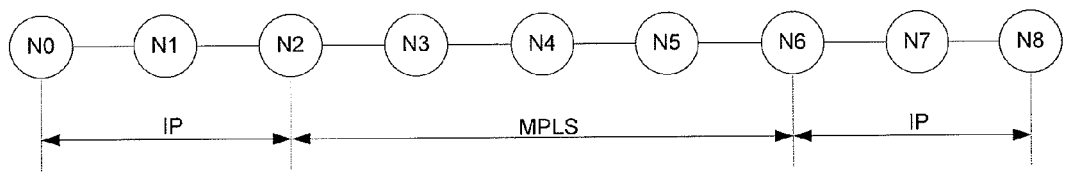
FIG. 2 is a schematic diagram illustrating a networking of a hybrid network including an IP network and an MPLS network.

This invention is hereinafter described by taking the hybrid network of an IP network and an MPLS network shown in FIG. 2 as an example.

Figure 3:
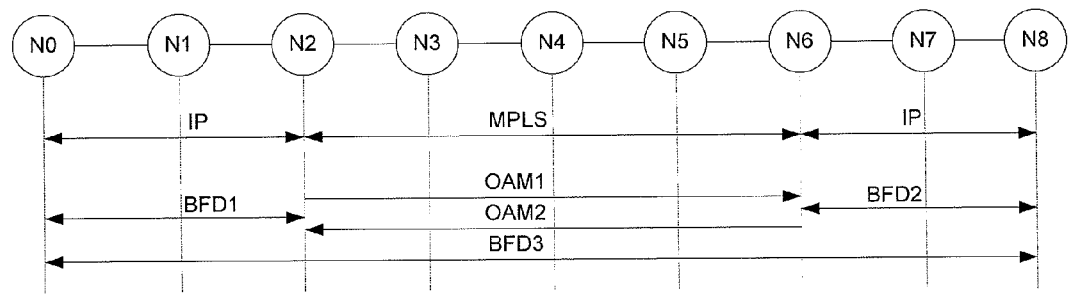
FIG. 3 is a schematic illustrating a method in accordance with a first embodiment of this invention.

FIG. 3 shows a schematic scheme in accordance with a first embodiment of this invention. As shown in FIG. 3, a BFD connection, i.e. a BFD session BFD1 is established between two nodes N0 and N2, a BFD connection BFD2 is established between two nodes N6 and N8 and a BFD connection BFD3 is established between two nodes N0 and N8 in the first embodiment, wherein BFD3 is an end-to-end connection. An ITUT MPLS OAM mechanism OAM1 is adopted in the direction of N2 to N6 and an OAM2 is adopted in the direction of N6 to N2. The ITUT MPLS OAM mechanism hereinafter refers to the MPLS OAM mechanism. In this embodiment, BFD1 and BFD2 may be in the asynchronous mode to perform a real-time detection, and BFD3 may be in the Demand mode after being established, that is, the detecting packets are not sent until required.

In this embodiment, the BFD connections BFD1 and BFD2 are parts of the BFD3 connection and may be considered as sub-BFD connections of the BFD3 connection. If multiple connections exist between N0 and N2, the BFD3 connection may include multiple sub-BFD connections.

In the hybrid network shown in FIG. 3, the detected end-to-end connection actually bears data flows between N0 and N8. At N2, an LSP tunnel may carry multiple end-to-end data flows simultaneously. If a failure occurs on an LSP between N2 and N6 and the LSP carries data flows from N0 to N8, it is required to notify N2 and N6 that the LSP carries the data flows from N0 to N8, and N2 and N6 should consider the notification into the BFD1 and BFD2 mechanisms. Also when the MPLS OAM is employed, the case that the LSP tunnel carries the monitored end-to-end flow should be considered. That is, N2 and N6 should be notified that the LSP carries the flow from N0 to N8, and be notified the IP address pair of N0/N8. Such notifying operations need implementing when BFD1 and BFD2 are initially established.

Each node may have multiple BFD connections simultaneously, and these BFD connections may be distinguished via a Discriminator field of 32 bits in a BFD control packet. The Discriminator includes a My Discriminator and a Your Discriminator, wherein the My Discriminator denotes a Discriminator of the sending side that sends the BFD control packet, and the Your Discriminator denotes a Discriminator of the receiving side that receives the BFD control packet. The Discriminator is generated when the connection is initially established.

A method for transmitting the IP address pairs in the duration of establishing a BFD connection between N0 and N2 is needed to make the Discriminators correspond to IP address pairs between N0 and N8.

In an embodiment of the present invention, a method for establishing a BFD connection by using a BFD control packet is disclosed. The general format of the BFD control packet may be referred to in the tables 1, 2 and 3. As the hybrid network shown in FIG. 3 is symmetric, the establishment of BFD1 and BFD3 is exemplified, and the establishment of BFD2 is identical to that of BFD1.

The process of establishing BFD1 is described in detail hereinafter.

N0 sends to N2 a first BFD control packet carrying the address pair of N0 and N8. The first BFD control packet is an extended packet of existing BFD control packet and is also an IP packet. The source IP address of the first BFD control packet is the address of N0 and the destination IP address of the first BFD control packet is the address of N2. The address pair of N0 and N8 is also included in an extended field of the BFD control packet.

As the existing BFD control packet has no field for containing an address pair to be transmitted, this embodiment of the present invention extends the format of the existing BFD control packet. The extended field is Type Length Vector (TLV). As shown in table 3, up to 255 authentication types of BFD may be defined according to the format of the BFD control packet. Nevertheless, only 5 of them are defined so far, and there may not be so many authentication types in actual applications. Thus in this embodiment of the present invention, the Most Significant Bit (MSB) of the Auth Type is used as an identifier of extending the TLV. That is, when the MSB of Auth Type is set to 1, it is indicated that the BFD control packet has an extended TLV field. The low 7 bits of Auth Type field still denotes the original authentication type. The format of an extended TLV field may be shown as table 4.

TABLE 4

| 0 1 2 3 4 5 6 7 8 9 | 0 1 2 3 4 5 6 7 8 9 | 0 1 2 3 4 5 6 ... |
|---|---|---|
| Auth Type | Auth Len | Authentication Data |
| TLV Type | | TLV Len |
| TLV Content | | |

As shown in table 4, the TLV Type indicates the type of TLV. The TLV Type indicates the TLV of an IP address pair when is set to 0 and indicates the TLV of a failure reporting when is set to 1; other values are reserved. The TLV Len indicates the length of TLV content, and is generally set to 8 in bytes. The TLV Content is the content of TLV. The TLV Content field contains IP address pairs when the TLV Type is 0 or 1. The format of TLV Content is shown as table 5.

TABLE 5

| 0 | 1 | 2 | 3 | 4 | 5 | 6 | 7 | 8 | 9 | 0 | 1 | 2 | 3 | 4 | 5 | 6 | 7 | 8 | ... |
|---|---|---|---|---|---|---|---|---|---|---|---|---|---|---|---|---|---|---|-----|
| IP source address, 4 bytes |||||||||||||||||||
| IP destination address, 4 bytes |||||||||||||||||||

As shown in table 5, the TLV Content denotes an end-to-end IP address pair including an IP source address and an IP destination address. In this embodiment, the IP source address is the address of N0 and the IP destination address is the address of N8.

In addition, as in general, the edge node between an IP network and an MPLS network, for example, N2 and N6, may handle more tasks, in this embodiment N0 is set as the active side and N2 as the passive side. N0 initiates a first BFD control packet for establishing BFD1 connection, and N2 receives the first BFD control packet passively. After the detecting mechanism is started, N0 will send a BFD control packet at a determined time interval to detect a link between N0 and N2. The time interval described in this embodiment is 1 second. Alternatively, the user may set the time interval.

N2 receives the first BFD control packet from N0.

In this embodiment, N2 is the passive side. After the detecting mechanism is started, N2 keeps waiting for a BFD control packet of which the source IP address is the address of N0.

After receiving the first BFD control packet from N0, N2 assigns for the N0/N8 address pair carried in the BFD control packet BFD1 Discriminators, including a Discriminator of N0 which is carried in the received first BFD control packet and a Discriminator of N2 which is stored in N2. The N0/N8 address pair corresponds to the BFD1 Discriminators. According to the address of N8, N2 searches, the route table and Forward Equivalent Class (FEC) table stored in N2 for an LSP number, wherein the destination address of the LSP corresponding to the LSP number is the adders of N8. The LSP number indicates the LSP bearing the data flows from N0 to N8 in the MPLS network. Subsequently, N2 sets up a table item, which includes three fields as the Discriminator of BFD1, the address pair of N0/N8 and the LSP number corresponding to the address pair of N0/N8.

With the foregoing table item set by N2, values of any two of the three fields may be obtained according to the other one of the three fields. In actual applications, two tables may be established. One is indexed by the Discriminator and the other by the LSP number, and the two tables may be refreshed simultaneously.

In this embodiment, assume that the LSP bears a data flow from N0 to N8, and the LSP number described in accordance with the embodiment of this invention refers to the an outer label of the LSP which may bear multiple end-to-end connections, thus the LSP number may correspond to multiple end-to-end address pairs. The method described in the embodiments of the present invention may be used to detect failures in each of the end-to-end data flows.

Then, enter the normal BFD negotiation mechanism. N2 sends to N0 a BFD control packet carrying negotiation parameters to negotiate other parameters of the BFD. Upon success of the negotiation, BFD1 connection is established successfully. The BFD1 connection adopts the Asynchronous Mode to periodically send a detecting packet to detect the link between N0 and N2 according to a negotiated rate.

At this point, a link information table, i.e. a relationship table is established on N0. The link information table includes an end-to-end address pair and an identifier of sub-BFD connection corresponding to the end-to-end address pair. In this embodiment, the link information table includes the address pair of N0/N8 and the identifier of BFD1 corresponding to the address pair of N0/N8. The identifier of BFD1 includes a Discriminator of N0 and a Discriminator of N2, and the Discriminator of N2 may be acquired according to the BFD control packet sent from N2 to N0.

As there may be multiple links between N0 and N8, it is required to establish multiple BFD connections, and there may be multiple BFD identifiers corresponding to the address pair of N0/N8.

Due to the symmetry of the network, the process of establishing BFD2 between N6 and N8 is similar to the establishing process of BFD1.

The process of establishing BFD3 is described in detail hereinafter.

First, store the IP address of peer end on N0 and N8 respectively, set N0 as the active side and set N8 as the passive side in this embodiment. After the detecting mechanism is started, N0 continuously sends, in a constant rate, a first BFD control packet of which the source IP address is the address of N0 and the destination IP address is the address of N8, and N8 keeps waiting to receive the BFD control packet from N0. After receiving the first BFD control packet, N8 itself establishes a table item including the address pair of N0/N8 and a Discriminator of BFD3 which includes a Discriminator of N0 and a Discriminator of N8, and the Discriminator of N0 is carried by the first BFD control packet. Afterwards N8 and N0 enter the normal BFD negotiation state and establish a BFD connection, and N0 acquires the Discriminator of N8 via the negotiation packet and establishes a table item of which the content includes the address pair of N0/N8 and the Discriminator of BFD3.

Upon being established, BFD3 works in the Demand mode, i.e. BFD3 dose not send the BFD control packet until an alarm requires.

In this embodiment, the link between N0 and N2 bearing BFD3 is different from the one bearing BFD1. If one link bears BFD1 and BFD3 simultaneously, a failed BFD1 will lead to a failed BFD3, which makes it impossible to send the failure information to N8 via BFD3.

The process of establishing an OAM is well known, thus this embodiment of the present invention makes use of the well known technique to establish an OAM connection.

As above, after the foregoing connections are established, two link information tables are established on N0. One includes the address pair of N0/N8 and the identifier of the sub-BFD connection corresponding to the address pair of N0/N8, i.e. the identifier of BFD1. The other includes the address pair of N0/N8 and the identifier of end-to-end BFD connection corresponding to the address pair of N0/N8, i.e. the identifier of BFD3.

Two link information tables are also established on N8. One includes the address pair of N0/N8 and the identifier of sub-BFD connection corresponding to the address pair of N0/N8, i.e. the identifier of BFD2, and the other includes the address pair of N0/N8 and the identifier of end-to-end BFD connection corresponding to the address pair of N0/N8, i.e. the identifier of BFD3.

Two link information tables are established on N2. One includes the address pair of N0/N8 and the identifier of sub-BFD connection corresponding to the address pair of N0/N8, i.e. the identifier of BFD 1, and takes the identifier of BFD connection as an index. The other table includes the address pair of N0/N8 and the identifier of MPLS connection corresponding to the address pair of N0/N8, i.e. the LSP number, and takes the LSP number as an index.

Two link information tables are also established on N6. One includes the address pair of N0/N8 and the identifier of sub-BFD connection corresponding to the address pair of N0/N8, i.e. the identifier of BFD2, and tales the identifier of BFD connection as an index. The other includes the address pair of N0/N8 and the identifier of MPLS connection corresponding to the address pair of N0/N8, i.e. the LSP number, and takes the LSP number as an index.

The foregoing is the process of establishing a detecting connection between N0 and N8 during end-to-end failure detection. The process of notifying N0 and N8 of a failure is hereinafter described when the failure occurs between N0 and N8.

In this embodiment, three issues should be concerned.

1. When a failure is detected in BFD1, the failure may be notified to N0 by using the existing BFD mechanism. However, how to notify N8 of the failure is the first issue.

2. When a failure is detected in BFD2, the failure may be notified to N8 by using the existing BFD mechanism. However, how to notify N0 of the failure is the second issue.

3. When the MPLS OAM detects a failure, how to notify N0 and N8 of the failure is the third issue.

The solutions to the forgoing three issues are hereinafter given respectively.

As an LSP is generally unidirectional, the direction from N0 to N8 is taken as an example.

Figure 4:
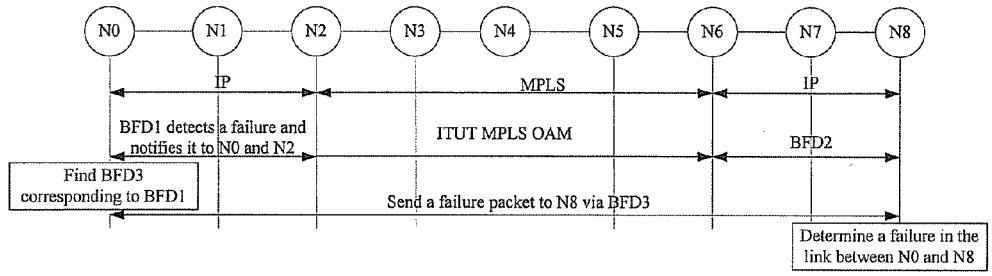
FIG. 4 is a schematic illustrating a method of failure detection in accordance with the first embodiment of this invention when a failure occurs between N0 and N2.

FIG. 4 shows a schematic of the network when a failure occurs on the link between N0 and N2. As shown in FIG. 4, when a failure occurs on the link between N0 and N2, BFD1 will detect the failure by using the existing BFD mechanism and notify N0 and N2 of the failure. After receiving a failure report, N0 finds, according to the identifier of BFD1 from the established link information table, the corresponding end-to-end address pair, i.e. the address pair of N0/N8 and finds, according to the address pair of N0/N8 from the other link information table, the corresponding identifier of end-to-end BFD connection, i.e. the identifier of BFD3. Subsequently, N0 sends, via BFD3 to N8, a BFD control packet carrying an identifier of the end-to-end failure, and the BFD control packet is also called a failure packet. After receiving the BFD control packet, N8 learns an end-to-end link failure according to the identifier of the end-to-end failure carried in the BFD control packet and determines that the failure occurs in the link between N0 and N8 according to the identifier of BFD3 i.e. the Discriminator of N0 and the Discriminator of N8 carried in the BFD control packet.

In addition, the recovery of BFD1 may be notified to N0 by the existing recovery packet, and N0 sends a recovery packet to N8 via BFD3, to notify N8 that BFD1 has been recovered. The mechanism of sending a recovery packet is well known, thus no further description is given here.

The failure packet described in embodiments of the present invention may be considered as an extended version of the existing BFD control packet. The Diagnostic field of the failure packet may be defined by extending the Diagnostic field of the existing BFD control packet in this embodiment. Refer to Table 3 for the definition of the existing BFD control packet. Values of 0 to 3 of the Diagnostic field of the existing BFD control packet have been used and values of 8 to 31 thereof are reserved, thus any integer between 8 and 31 may be used as the identifier of an end-to-end failure. In this embodiment, if the Diagnostic field is set to 8, an end-to-end failure is indicated. When the failure packet is sent to the destination node N8, N8 determines that a failure occurs on the link between nodes designated by My Discriminator and Your Discriminator carried by the failure packet, i.e. after receiving the failure packet sent by N0, N8 determines that a failure occurs on the link between N0 and N8.

Due to the symmetry of the IP network shown in FIG. 4, when a failure occurs in the link between N6 and N8, BFD2 may detect the failure by using the existing BFD mechanism and notify N6 and N8 of the failure. After receiving a failure report, N8 finds, according to the identifier of BFD1, from the established link information table the corresponding address pair of N0/N8 and finds, according to the address pair of N0/N8, from the other link information table the identifier of BFD3. N8 sends, via BFD3, to N0 a BFD control packet carrying an identifier of the end-to-end failure. After receiving the BFD control packet, N0 learns that a failure occurs in the link between N0 and N8 according to the identifier of the end-to-end failure carried in the BFD control packet.

Figure 5:
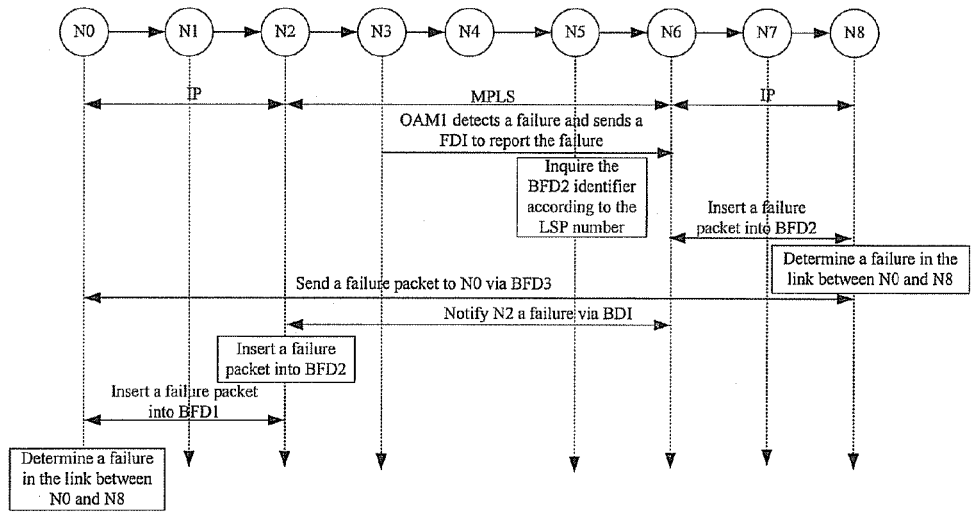
FIG. 5 is a schematic illustrating a method of failure detection in accordance with the first embodiment of this invention when a failure occurs between N2 and N6.

FIG. 5 shows a schematic of the network when a failure occurs in the link between N2 and N6. As shown in FIG. 5, when a failure occurs in the link between N2 and N6, and suppose that the failure is a unidirectional failure from N2 to N6, OAM1 is employed to detect the failure by using the FDI mechanism of the existing MPLS OAM detecting mechanism and sends an FDI packet to N6. After receiving the FDI packet, N6 learns that a failure occurs in the unidirectional link from N2 to N6. According to the LSP number of the FDI packet, N6 finds from the link information table the end-to-end address pair corresponding to the LSP number, i.e. the address pair of N0/N8, and according to the found end-to-end address pair, finds from the other table the identifier of sub-BFD connection corresponding to the end-to-end address pair, i.e. the identifier of BFD2. N6 then inserts a failure packet into the BFD connection indicated by the found identifier of sub-BFD connection, i.e. N6 inserts a failure packet into BFD2. This failure packet, like that inserted in BFD3, is also an extended version of the existing BFD control packet and has an extended value of Diagnostic field to indicate a failure. After receiving the failure packet, N8 finds, according to the identifier of BFD2 carried in the failure packet, from the link information table, the end-to-end address pair corresponding to the identifier of BFD2, i.e. the address pair of N0/N8, to determine that a failure occurs in the link between N0 and N8. N8 finds the identifier of BFD3 corresponding to the address pair from the other link information table according to the address pair of N0/N8, and sends the BFD control packet carrying the identifier of the end-to-end failure to N0 via BFD3. After receiving the BFD control packet, N0 determines that a failure occurs in the link between N0 and N8 according to the identifier of BFD3 and the identifier of the end-to-end failure carried in the BFD control packet.

In addition, a unidirectional link failure from N2 to N6 may also be notified to N0 by N2, and the process may include the followings:

After receiving the FDI packet, N6 notifies N2 that a failure occurs in the unidirectional link from N2 to N6 by using a BDI packet. N2 finds, according to the LSP number of the BDI packet, from the link information table the end-to-end address pair corresponding to the LSP number, i.e. the address pair of N0/N8, and finds, according to the found end-to-end address pair, from the other table the identifier of BDI connection corresponding to the end-to-end address pair, i.e. the identifier of BFD1. N2 inserts a failure packet into the BFD connection indicated by the found identifier of BFD connection, i.e. N2 inserts a failure packet into BFD1, and the format of the failure packet is identical to that inserted in BFD3 and contains an extended value of Diagnostic field to indicate a failure. After receiving the failure packet, N0 finds, according to the identifier of BFD1 carried in the failure packet, from the link information table the end-to-end address pair i.e. the address pair of N0/N8 corresponding to the identifier of BFD1, to determine that a failure occurs in the link between N0 and N8.

N6 may find multiple identifiers of BFD connections and insert a failure packet into each BFD connection in the above process, thus BFD2 may be taken as an example.

Similarly, when a unidirectional link failure from N6 to N2 occurs, the failure may also be notified to N0 and N8 by using the forgoing processes.

Figure 6:
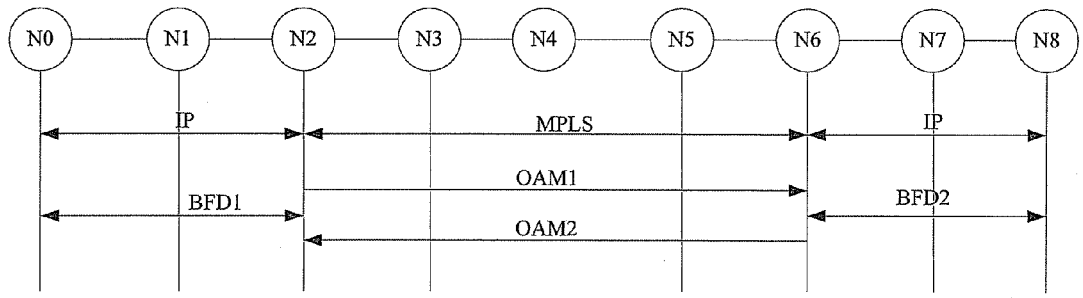
FIG. 6 is a schematic illustrating a method in accordance with a second embodiment of this invention.

FIG. 6 shows a schematic scheme in accordance with a second embodiment of this invention. As shown in FIG. 6, a BFD connection BFD1 is established between N0 and N2 and a BFD connection BFD2 is established between N6 and N8 in the second embodiment by using the BFD mechanism. An ITUT MPLS OAM detecting mechanism OAM1 exists in the direction from N2 to N6 and an ITUT MPLS OAM detecting mechanism OAM2 exists in the direction from N6 to N2.

The processes of establishing BFD1 and BFD2 connections are identical to that described in the first embodiment. After the establishment is successful, a link information table is established on N0, including the address pair of N0/N8 and the identifier of sub-BFD connection corresponding to the address pair of N0/N8, i.e. the identifier of BFD1.

A link information table is also established on N8, which includes the address pair of N0/N8 and the identifier of sub-BFD connection corresponding to the address pair of N0/N8, i.e. the identifier of BFD2.

Two link information tables are established on N2. One includes the address pair of N0/N8 and the identifier of sub-BFD connection corresponding to the address pair of N0/N8, i.e. the identifier of BFD1, and takes the identifier of BFD connection as an index. The other includes the address pair of N0/N8 and the identifier of MPLS connection corresponding to the address pair of N0/N8, i.e. the LSP number, and takes the LSP number as an index.

Two link information tables are also established on N6. One includes the address pair of N0/N8 and the identifier of sub-BFD connection corresponding to the address pair of N0/N8, i.e. the identifier of BFD2, and takes the identifier of BFD connection as an index. The other includes the address pair of N0/N8 and the identifier of MPLS connection corresponding to the address pair of N0/N8, i.e. the LSP number, and takes the LSP number as an index.

The processing in accordance with the second embodiment of this invention is different from that of the first embodiment when a failure occurs in the link between N0 and N2 as well as the link between N6 and N8, and the description is hereinafter given by supposing that a failure occurs in the link between N0 and N2.

Figure 7:
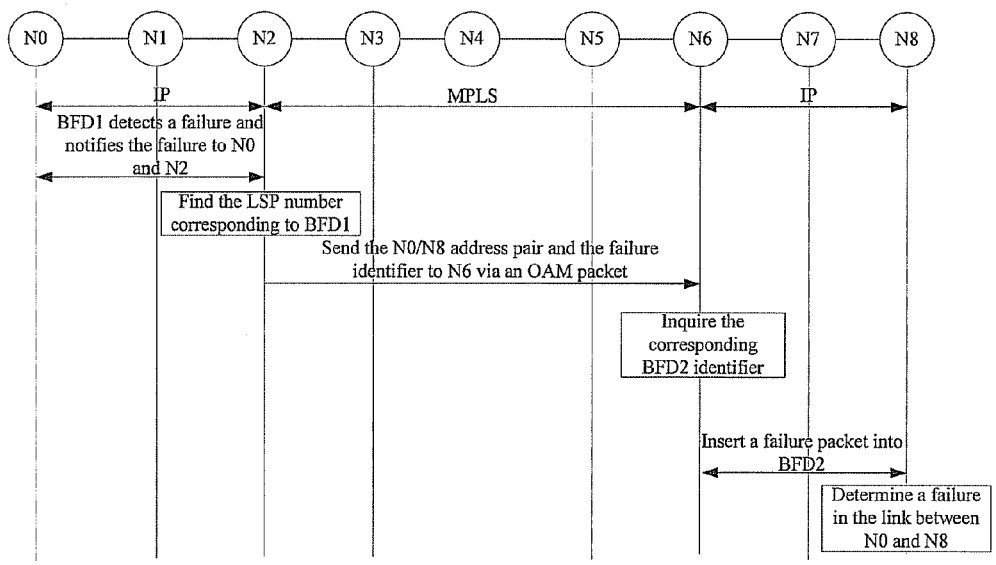
FIG. 7 is a schematic illustrating a method of failure detection in accordance with the second embodiment of this invention when a failure occurs between N0 and N2.

FIG. 7 shows a schematic network in accordance with the second embodiment of the present invention when a failure occurs in the link between N0 and N2. As shown in FIG. 7, when a failure occurs in the link between N0 and N2, BFD1 detects the failure by using the existing BFD mechanism and sends failure reports to N0 and N2. After receiving the failure report, N2 finds, according to the identifier of BFD1, from the established link information table the corresponding end-to-end address pair, i.e. the address pair of N0/N8, and finds, according to the address pair of N0/N8, from the other link information table the LSP number corresponding to the address pair of N0/N8. N2 sends to N6 an OAM packet via the LSP, in which the OAM packet is an extended version of the existing OAM packet. The extended OAM packet may be a CV packet or an FFD packet, including an end-to-end address pair field and a failure identifier field. The end-to-end address pair field records the address pair of N0/N8 and the failure identifier field records the failure identifier. After receiving the OAM packet, according to the LSP number of the OAM packet, N6 finds the identifiers of all sub-BFD connections corresponding to the LSP number from the link information table, and according to the address pair of N0/N8 carried in the OAM packet, finds the identifier of sub-BFD connection corresponding to the address pair of N0/N8 from the found identifiers of BFD, i.e. the identifier of BFD2. N6 inserts a failure packet into BFD2, and the format of the failure packet is identical to that inserted in BFD3 in the first embodiment and contains an extended value of Diagnostic field to indicate a failure. After receiving the failure packet, according to the identifier of BFD2 carried in the failure packet, N8 finds the end-to-end address pair corresponding to the identifier of BFD2 from the link information table, i.e. the address pair of N0/N8, and determines that a failure occurs in the link between N0 and N8.

Similarly, when a failure occurs in the link between N6 and N8, the failure may also be notified to N0 by using the above processes.

Figure 8:
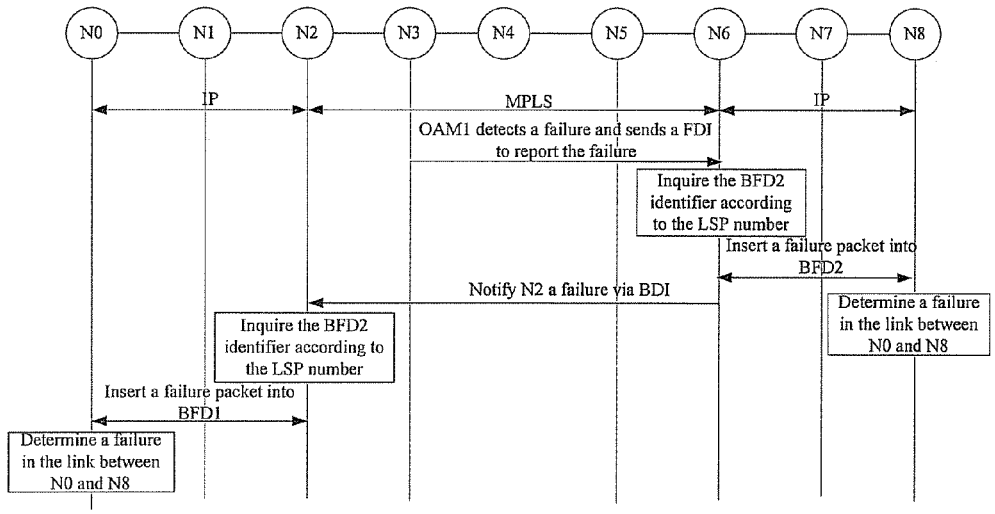
FIG. 8 is a schematic illustrating a method of failure detection in accordance with the second embodiment of this invention when a failure occurs between N2 and N6.

FIG. 8 shows a schematic network in accordance with the second embodiment of this invention when a failure occurs in the link between N2 and N6. As shown in FIG. 8, when a failure occurs in the link between N2 and N6, and suppose that the failure is a unidirectional failure from N2 to N6, OAM1 sends an FDI packet to N6 by using the FDI mechanism of existing MPLS OAM detecting mechanism. After receiving the FDI packet, N6 learns that a failure occurs in the unidirectional link from N2 to N6. According to the LSP number of the FDI packet, N6 finds the end-to-end address pair corresponding to the LSP number, i.e. the address pair of N0/N8, from the link information table, and according to the found end-to-end address pair, finds the identifier of BFD connection corresponding to the end-to-end address pair, i.e. the identifier of BFD2 from the other table. N6 inserts a failure packet into the BFD connection indicated by the found identifier of BFD connection, i.e. N6 inserts a failure packet into BFD2, and the format of the failure packet is identical to that inserted in BFD3 and contains an extended value of Diagnostic field to indicate a failure. After receiving the failure packet, according to the identifier of BFD2 carried in the failure packet, N8 finds the end-to-end address pair corresponding to the identifier of BFD2 from the link information table, i.e. the address pair of N0/N8, and determines that a failure occurs in the link between N0 and N8.

After receiving the FDI packet, N6 notifies N2 that a failure occurs in the unidirectional link from N2 to N6 by using a BDI packet. N2 finds the end-to-end address pair corresponding to the LSP number, i.e. the address pair of N0/N8, from the link information table according to the LSP number of the BDI packet, and finds the identifier of BDI connection corresponding to the end-to-end address pair, i.e. the identifier of BFD1 from the other table according to the found end-to-end address pair. N2 inserts a failure packet into the BFD connection indicated by the found identifier of BFD connection, i.e. N2 inserts a failure packet into BFD1, and the format of the failure packet is identical to that inserted in BFD3 and contains an extended value of Diagnostic field to indicate a failure. After receiving the failure packet, N0 finds the end-to-end address pair corresponding to the identifier of BFD1, i.e. the address pair of N0/N8 from the link information table according to the identifier of BFD1 carried in the failure packet, and determines that a failure occurs in the link between N0 and N8.

The foregoing are only preferred embodiments of this invention. The protection scope of this invention, however, is not limited to the above description. Any change or substitution, within the technical scope disclosed by this invention, easily occurring to those skilled in the art should be covered by the protection scope of this invention.

The invention claimed is:

1. A method for detecting a link failure between nodes in a hybrid network which includes an Internet Protocol (IP) network segment using a Bidirectional Forwarding Detection (BFD) mechanism and including a node therein, and a Multi-Protocol Label Switching (MPLS) network segment using an MPLS Operation and Maintenance (OAM) mechanism and including a peer node therein corresponding to the node, comprising:

establishing a sub-BFD connection between the node and an edge node which is in both the IP network segment and the MPLS network segment and is adjacent to the node;

establishing an end-to-end BFD connection between the node and the peer node;

establishing on the edge node a first table including an end-to-end address pair of the node and peer node, an Label Switched Path (LSP) number corresponding to the end-to-end address pair and an identifier of the sub-BFD connection corresponding to the end-to-end address pair;

establishing on the node a second table including the end-to-end address pair, the identifier of the sub-BFD connection corresponding to the end-to-end address pair and an identifier of the end-to-end BFD connection corresponding to the end-to-end address pair;

upon detecting a first failure on the sub-BFD connection of the IP network segment, the node inquiring the end-to-end address pair corresponding to the identifier of the sub-BFD connection from the second table, inquiring the identifier of the end-to-end BFD connection corresponding to the inquired end-to-end address pair from the second table, and notifying the first failure to the peer node via the inquired end-to-end BFD connection; and upon detecting a second failure by the MPLS OAM mechanism of the MPLS network segment, the edge node inquiring the end-to-end address pair corresponding to an LSP number of a failed LSP from the first table, inquiring the identifier of the sub-BFD connection corresponding to the inquired end-to-end address pair from the first table, and notifying the node of the second failure via the inquired sub-BFD connection.

2. The method of claim 1, wherein establishing a sub-BFD connection between the node and the edge node comprises:

sending a BFD control packet carrying the end-to-end address pair to the edge node by the node; and upon receiving the BFD control packet, the edge node establishing the sub-BFD connection with the node and setting the sub-BFD connection in an asynchronous mode.

3. The method of claim 2, wherein the BFD control packet carrying the end-to-end address pair comprises an extended Type Length Vector (TLV) field and the end-to-end address pair is in the TLV field.

4. The method of claim 1, wherein the second failure detected by the MPLS OAM mechanism of the MPLS network segment is a unidirectional failure and the edge node is an edge node designated by the unidirectional failure, the method further comprising:

upon notifying the node of the second failure via the inquired sub-BFD connection by the edge node, the node inquiring the end-to-end address pair corresponding to the identifier of the sub-BFD connection from the second table, inquiring the identifier of the end-to-end BFD connection corresponding to the inquired end-to-end address pair from the second table, and notifying the peer node of the second failure via the inquired end-to-end BFD connection.

5. The method of claim 1, wherein the node notifying the peer node of the first failure via the inquired end-to-end BFD connection comprises:

the node inserting into the inquired end-to-end BFD connection a BFD control packet which carries an identifier of an end-to-end failure and sending the BFD control packet to the peer node; and upon receiving the BFD control packet, the peer node determining that the first failure occurs in a link between the node and the peer node detected by the end-to-end BFD connection according to the identifier of the end-to-end failure carried in the BFD control packet.

6. The method of claim 4, wherein the node notifying the peer node of the first failure via the inquired end-to-end BFD connection comprises:

the node inserting into the inquired end-to-end BFD connection a BFD control packet which carries an identifier of an end-to-end failure and sending the BFD control packet to the peer node; and upon receiving the BFD control packet, the peer node determining that the first failure occurs in a link between the node and the peer node detected by the end-to-end BFD connection according to the identifier of the end-to-end failure carried in the BFD control packet.

7. The method of claim 5, wherein the identifier of the end-to-end failure is denoted by the bit value of a Diagnostic field of the BFD control packet in a range from 8 to 31.

8. The method of claim 6, wherein the identifier of the end-to-end failure is denoted by the bit value of a Diagnostic field of the BFD control packet in a range from 8 to 31.

9. A method for detecting a link failure between nodes in a hybrid network which includes at least two Internet Protocol (IP) network segments using a Bidirectional Forwarding Detection (BFD) mechanism and including a first IP network segment with a node therein and a second IP network segment with a peer node therein corresponding to the node, and a Multi-Protocol Label Switching (MPLS) network segment using an MPLS Operation and Maintenance (OAM) mechanism, comprising:

establishing a first sub-BFD connection between the node in the first IP network segment and a first edge node which is in both the first IP network segment and the MPLS network segment and is adjacent to the node;

establishing on the first edge node a first table including an end-to-end address pair of the node and peer node, an Label Switched Path (LSP) number corresponding to the end-to-end address pair and an identifier of the first sub-BFD connection corresponding to the end-to-end address pair;

establishing on a second edge node a second table including the end-to-end address pair of the node and the peer node, an LSP number corresponding to the end-to-end address pair and identifiers of second sub-BFD connections, wherein the second sub-BFD connections are established between the second edge node and the peer node and are corresponding to the LSP number, and the second edge node is in both a second IP network segment and the MPLS network segment and adjacent to the peer node;

upon detecting a first failure on the first sub-BFD connection, the first edge node inquiring the end-to-end address pair corresponding to the identifier of the first sub-BFD connection and inquiring the LSP number corresponding to the inquired end-to-end address pair from the first table, and sending an OAM packet carrying a failure identifier and the inquired end-to-end address pair to the second edge node via an LSP corresponding to the LSP number inquired;

upon receiving the OAM packet, the second edge node inquiring identifiers of all the second sub-BFD connections corresponding to the LSP number from the second table and inquiring an identifier of a second sub-BFD connection corresponding to the end-to-end address pair from the identifiers of all the second sub-BFD connections according to the LSP number of the OAM packet, and notifying the peer node of the first failure via the second sub-BFD connection corresponding to the identifier of the second sub-BFD connection inquired; and upon detecting a second failure by the MPLS OAM mechanism of MPLS network segment, the first edge node inquiring an end-to-end address pair corresponding to an LSP number of a failed LSP from the first table, inquiring an identifier of a first sub-BFD connection corresponding to the inquired end-to-end address pair from the first table, and notifying the node of the second failure via the first sub-BFD connection inquired.

10. The method of claim 9, wherein the establishing a first sub-BFD connection between the node and the first edge node comprises:

sending by the node a BFD control packet carrying the end-to-end address pair to the first edge node; and upon receiving the BFD control packet, the first edge node establishing the first sub-BFD connection with the node and setting the first sub-BFD connection in an asynchronous mode.

11. The method of claim 10, wherein the BFD control packet carrying the end-to-end address pair comprises an extended Type Length Vector (TLV) field and the end-to-end address pair is in the TLV field.

12. The method of claim 9, further comprising:

establishing on the peer node a third table including the identifiers of the second sub-BFD connections and the end-to-end address pair corresponding to the identifiers of the second sub-BFD connections, wherein the second sub-BFD connections are established between the second edge node and the peer node and are corresponding to the LSP number;

wherein the second edge node adjacent to the peer node notifying the peer node of the second failure via the inquired sub-BFD connection comprises:

the second edge node inserting into the second sub-BFD connection inquired a BFD control packet carrying the failure identifier and sending the BFD control packet to the peer node; upon receiving the BFD control packet, the peer node acquiring the identifier of the second sub-BFD connection inquired from the BFD control packet and inquiring the end-to-end address pair corresponding to the identifier of the second sub-BFD connection from the third table, and determining that the second failure occurs in a link between the node and the peer node indicated by the inquired end-to-end address pair according to the failure identifier carried in the BFD control packet.

13. The method of claim 12, wherein the failure identifier is denoted by the bit value of a Diagnostic field of the BFD control packet in a range from 8 to 31.

14. A system for detecting a link failure between nodes in a hybrid network, comprising:

a node in an Internet Protocol (IP) network using a Bidirectional Forwarding Detection (BFD) mechanism;

a peer node in a Multi-Protocol Label Switching (MPLS) network segment using an MPLS Operation and Maintenance (OAM) mechanism and corresponding to the node;

an edge node configured in both the IP network segment and the MPLS network segment; wherein a sub-BFD connection is established between the node and the edge node; an end-to-end BFD connection is established between the node and the peer node;

the edge node is configured with a first table including an end-to-end address pair of the node and peer node, an Label Switched Path (LSP) number corresponding to the end-to-end address pair and an identifier of the sub-BFD connection corresponding to the end-to-end address pair; and the node is configured with a second table including the end-to-end address pair, the identifier of the sub-BFD connection corresponding to the end-to-end address pair and an identifier of the end-to-end BFD connection corresponding to the end-to-end address pair;

when a first failure is detected on the sub-BFD connection of the IP network segment, the node inquires the end-to-end address pair corresponding to the identifier of the sub-BFD connection from the second table, inquires the identifier of the end-to-end BFD connection corresponding to the inquired end-to-end address pair from the second table, and notifies the first failure to the peer node via the inquired end-to-end BFD connection; and when a second failure is detected by the MPLS OAM mechanism of the MPLS network segment, the edge node inquires the end-to-end address pair corresponding to an LSP number of a failed LSP from the first table, inquires the identifier of the sub-BFD connection corresponding to the inquired end-to-end address pair from the first table, and notifies the second failure to the node via the inquired sub-BFD connection.

15. A system for detecting a link failure between nodes in a hybrid network, comprising:

a node in a first Internet Protocol (IP) network segment, and a peer node in a second IP network segment corresponding to the node, wherein the first and second IP network segment use a Bidirectional Forwarding Detection (BFD) mechanism;

a first edge node configured in both the first IP network segment and a Multi-Protocol Label Switching (MPLS) network segment and being adjacent to the node, and a second edge node configured in both the second IP network segment and the MPLS network segment and being adjacent to the peer node, wherein the MPLS network segment uses an MPLS Operation and Maintenance (OAM) mechanism;

wherein the node and the first edge node are configured to establish a first sub-BFD connection between the node and the first edge node;

the first edge node is configured with a first table including an end-to-end address pair of the node and peer node, an Label Switched Path (LSP) number corresponding to the end-to-end address pair and an identifier of the first sub-BFD connection corresponding to the end-to-end address pair;

the second edge node is configured with a second table including an end-to-end address pair of the node and the peer node, an LSP number corresponding to the end-to-end address pair and identifiers of second sub-BFD connections, wherein the second sub-BFD connections are established between the second edge node and the peer node and are corresponding to the LSP number;

upon detecting a first failure on the first sub-BFD connection of the IP network segment, the first edge node inquires the end-to-end address pair corresponding to the identifier of the first sub-BFD connection and inquires the LSP number corresponding to the inquired end-to-end address pair from the first table, and sends an OAM packet carrying a failure identifier and the inquired end-to-end address pair to the second edge node via an LSP corresponding to the LSP number inquired;

upon receiving the OAM packet, the second edge node inquires identifiers of all the second sub-BFD connections corresponding to the LSP number from the second table and inquires an identifier of a second sub-BFD connection corresponding to the end-to-end address pair from the identifiers of all the second sub-BFD connections according to the LSP number of the OAM packet, and notifying the peer node of the first failure via the second sub-BFD connection corresponding to the identifier of the second sub-BFD connection inquired; and upon detecting a second failure by the MPLS OAM mechanism of MPLS network segment, the first edge node inquires an end-to-end address pair corresponding to an LSP number of a failed LSP from the first table, inquires an identifier of a first sub-BFD connection corresponding to the inquired end-to-end address pair from the first table, and notifies the node of the second failure via the first sub-BFD connection.

* * * * *